455-611 AU 233 EX

FIP8106 OR 3,569,715

United States Patent [11] 3,569,715

[72] Inventor Robert R. Horning
Livermore, Calif.

[21] Appl. No. 757,657
[22] Filed Sept. 5, 1968
[45] Patented Mar. 9, 1971
[73] Assignee The United States of America as represented by the United States Atomic Energy Commission

[54] ELECTRO-OPTICAL TELEMETRY SYSTEM RECEIVER UTILIZING NEGATIVE FEEDBACK TO ELIMINATE ATMOSPHERICALLY INDUCED LOW FREQUENCY LIGHT BEAM INTENSITY VARIATIONS
5 Claims, 1 Drawing Fig.

[52] U.S. Cl. .......... 250/199, 350/150
[51] Int. Cl. .......... H04b 9/00, G02f 1/16
[50] Field of Search .......... 250/199 (Inquired); 331/94.5 (Inquired); 325/(Inquired); 350/150 (Inquired)

[56] References Cited

UNITED STATES PATENTS

| | | | |
|---|---|---|---|
| 3,214,590 | 10/1965 | Schactman .......... | 350/150 |
| 3,420,600 | 1/1969 | Mevers et al. .......... | 250/199 |
| 3,457,414 | 7/1969 | Ragon et al. .......... | 250/199 |

*Primary Examiner*—Robert L. Griffin
*Assistant Examiner*—James A. Brodsky
*Attorney*—Ronald A. Anderson

ABSTRACT: An electro-optical telemetry system wherein a light beam is modulated with high frequency information signals for transmission to a receiver that includes a photodetector for transducing the modulated light beam to electric information signals, a frequency filter connected to the output of the photodetector for extraction of low frequencies that are induced in the transmitted beam by atmospheric turbulence, and a light modulator at the receiver input to which the extracted low frequencies are negatively fed back to substantially eliminate the atmospherically induced variations in the received light beam.

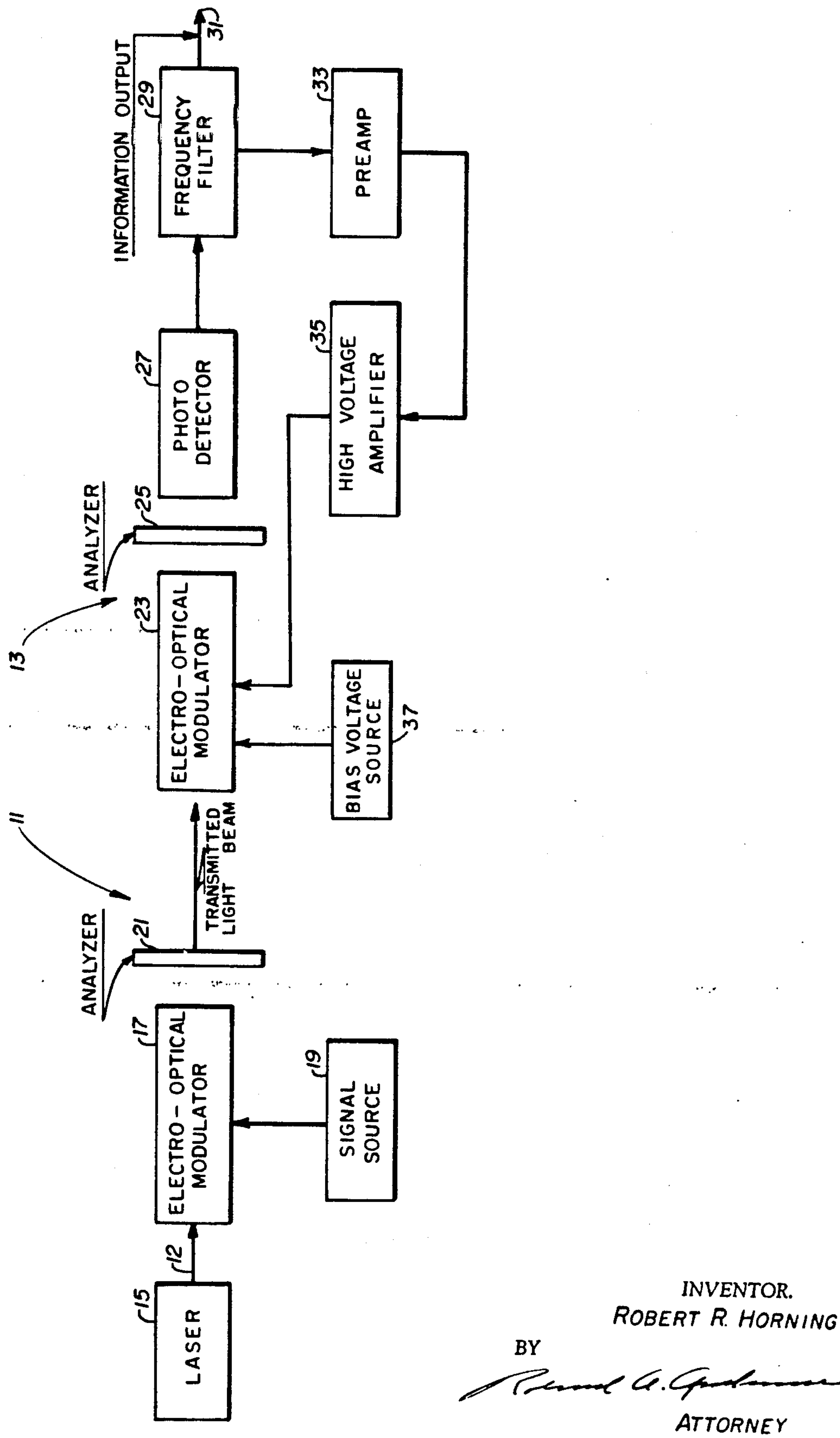
INVENTOR.
ROBERT R. HORNING
BY
[signature]
ATTORNEY

ELECTRO-OPTICAL TELEMETRY SYSTEM RECEIVER UTILIZING NEGATIVE FEEDBACK TO ELIMINATE ATMOSPHERICALLY INDUCED LOW FREQUENCY LIGHT BEAM INTENSITY VARIATIONS

The invention disclosed herein was made under, or in, the course of Contract No. W–7405,–ENgG–48 with the United States Atomic Energy Commission.

BACKGROUND OF THE INVENTION

This invention relates to an electro-optical telemetry system, and more particularly, it relates to a light beam receiver in which atmospherically induced low frequency light beam intensity variations are eliminated by negatively feeding back the variations from the receiver output to the receiver input.

In certain types of communication systems, in particular a transmission system for the time history data of a nuclear explosion, it is important to preserve the original shape of the signal. Such signals can have a dynamic range greater than $10^6$ and a bandwidth from 100 kc. to greater than 300 mc. Signals having this dynamic range and bandwidth cannot be transmitted by radio or over miles of cable without signal distortion that would remove essential information. One solution that results in a minimum of distortion is light beam transmission, with its inherently wide bandwidth. However, a major problem found to exist in a terrestial light communication system, or any light transmission through an atmosphere, is that low frequency intensity variations of frequencies less than 1 Kc. are induced into the light beam by optical nonuniformities resulting from atmospheric turbulence. Atmospheric turbulence causes changes in the density of successive air masses traversed by the beam. These density changes produce successive refractions of the light beam, causing the beam to scintillate and thereby induce intensity variations in the beam. One approach for eliminating atmospherically induced intensity variations is to provide conventional automatic gain control electronic circuits in the receiver. However, there are no known electronic circuits capable of handling signals having a dynamic range of $10^6$ and a bandwidth from 100 kc. to greater than 300 mc. Furthermore, no system, either electronic, optical, or electro-optical, prior to the present invention, is known for effectively eliminating atmospherically induced interference in such a light beam communication system.

SUMMARY OF THE INVENTION

In accordance with the present invention, a light beam is modulated with high frequency information signals and transmitted through the atmosphere to a receiver where it is transduced to electric output signals which are filtered to obtain low frequency intensity variations that have been induced in the light beam by atmospheric turbulence. The low frequencies are fed back negatively to the receiver input where they are used for inverse control of an electro-optical modulator. With this arrangement the low frequency atmospherically-induced intensity variations are effectively eliminated from the high frequency information signals. The invention may be used in any of the various alternative types of light communication systems wherein the light beam may be frequency modulated, intensity modulated, phase modulated, or polarization modulated.

An object of the invention is to eliminate low frequency atmospherically induced amplitude variations in the output signal of an electro-optical telemetry system.

Another object is to extract low frequencies from the electrical output of an electro-optical receiver and negatively feed back the frequencies to the receiver input for their elimination in the receiver output.

Another object is to extract low frequency electrical variations from an intensity modulated light beam and then apply the electrical variations to an electro-optical modulator for inverse modulation of the beam and consequent elimination of the low frequencies.

Other objects and advantageous features of the invention will be apparent from a description of a specific embodiment thereof, given by way of example only, to enable one skilled in the art to readily practice the invention, and described hereinafter with reference to the accompanying drawing.

BRIEF DESCRIPTION OF THE DRAWING

The FIG. is a diagram of an electro-optical telemetry system showing the various elements in block form, according to the invention.

DESCRIPTION OF AN EMBODIMENT

Referring to the drawing, an electro-optical telemetry system is shown that includes a transmitter 11 in which a light beam 12 is originated and modulated with high frequency information signals. The information-modulated beam is then transmitted to a receiver 13 where it is transduced to electrical information signals. The transmitter is comprised of a polarized light source 15, such as a laser, for generating a light beam that is transmitted through an electro-optical modulator 17, such as a Kerr cell, Faraday modulator, or Pockels cell, in which the light beam undergoes polarization modulation in response to electrical information signals applied to the modulator from a signal source 19. The beam is then transmitted through a conventional optical analyzer 21 for converting the beam's polarization modulation to intensity modulation. In accordance with the invention, the analyzer 21 may be located at the output of the transmitter 11 or alternatively before the input to the receiver 13; however, the analyzer 21 is shown associated with the transmitter for convenience of adjustment.

At the receiver 13, the intensity-modulated beam is transmitted through an electro-optical modulator 23, similar to the modulator 17 and an optical analyzer 25 to a photodetector 27 for transduction to electrical information signals corresponding to the signals at the source 19. The signals from the photodetector are applied to a frequency filter 29 for conduction to an information output 31 for utilization.

In the event the transmitted light beam undergoes low frequency intensity variations induced by atmospheric turbulence, the variations will be transduced by the photodetector 27 and applied to the input of the frequency filter 29. The filter 29 may be designed, using conventional network theory and techniques, to pass only low frequencies, less than 1 kc., to a preamplifier 33 having its output connected to the input of a high voltage amplifier 35. The output of the amplifier 35 is connected to the modulator 23. The filter 29, preamplifier 33 and amplifier 35 are arranged to be a negative feedback circuit for inversely applying the low frequency electrical signals to the modulator 23. In the system shown in the FIG., the transmitted light beam is in a condition of intensity modulation at the modulator 23. Therefore, the polarization modulator due to the negative feedback signals does not interfere with the information content of the light beam. The analyzer 25 converts only the polarization modulation that is imposed on the beam by modulator 23 to intensity modulation of the beam, also without interfering with the information content of the beam since the analyzer converts only polarization modulation. When the invention is used in light communication systems in which modulation other than polarization modulation is used, there is no need to convert the modulation to some other type prior to its passage through the modulator 23; consequently, the analyzer 21 or equivalent converter would not need to be interposed between the transmitter and receiver in these other systems.

In order that there may be compensation for fluctuations during which the light intensity is reduced, it is necessary to give the transmitted light beam a polarization bias to provide a polarization base or operating point in the modulator around which the beam can be modulated with the feedback signals. Conveniently, such a bias may be provided by applying a DC voltage from the amplifier 35 to the modulator 23 or from a separate bias voltage source 37. Alternatively, a biasing plate could be placed between the modulator 23 and the analyzer 25.

In an embodiment of the invention that was constructed and tested, a laser beam was transmitted without being information modulated over a path of 1,500 feet. The atmosphere induced intensity fluctuations were of such magnitude that the ratio of maximum to minimum of light received was about 2 to 1. The electro-optical feedback system of the present invention reduced these fluctuations to about 1.003 to 1.

While an embodiment of the invention has been shown and described, further embodiments or combinations of those described herein will be apparent to those skilled in the art without departing from the spirit of the invention or from the scope of the appended claims.

I claim:

1. In an electro-optical telemetry system including a source of light that is information-modulated at a high frequency and transmitted in a beam through an atmosphere subject to variable optical inhomogeneities that induce low frequency intensity variations in said beam, the combination of:

a. means for transducing said information-modulated light beam to electric information signals;

b. a frequency filter connected to the output of said transducing means for extracting low frequency electrical variations from said information signals;

c. modulating means interposed in the path of said beam between said source and said transducing means said modulating means being arranged to transmit said beam therethrough to said transducing means in a condition of information modulation that retains the information content of the beam during passage of the beam through said modulating means;

d. means for negatively feeding back to said modulating means said extracted low frequency electrical variations for inverse control of said modulating means for substantially eliminating said low frequency intensity variations induced in said transmitted light beam; and e. wherein said modulating means includes: a modulator responsive to said low frequency electrical variations to effect corresponding inverse polarization modulation of said beam within said modulator; and means for converting said inverse polarization modulation of said beam into inverse intensity variations.

2. The combination of claim 1, further including biasing means coupled to said beam for providing said modulating means with an operating point around which said modulating means can be driven.

3. The combination of claim 2, wherein said biasing means is a source of DC voltage that is applied to said modulating means.

4. The combination of claim 1, further including means coupled to said beam for imposing information on said transmitted beam by polarization modulation, and modulation conversion means interposed between said source and said modulating means for converting the information modulation of the beam from polarization modulation to intensity modulation.

5. The combination of claim 4, wherein said transducing means is a photodetector, and said modulating means includes an electro-optical polarization modulator, and an optical analyzer interposed between said modulator and photodetector for transducing polarization modulation of said beam by said electro-optical polarization modulator to intensity modulation.